United States Patent
Phillips et al.

[11] 3,750,307
[45] Aug. 7, 1973

[54] EDUCATIONAL DEVICE

[76] Inventors: Morton Phillips, 67-70 Yellowstone Blvd., Forest Hills, N.Y. 11375; Robert Klenosky, 75-68 181st Street, Flushing, N.Y. 11365

[22] Filed: June 12, 1972

[21] Appl. No.: 262,070

[52] U.S. Cl. .................................... 35/35 J, 35/71
[51] Int. Cl. ...................... G09b 17/00, G09b 1/36
[58] Field of Search .................. 35/35 R, 35 J, 71, 35/72; 273/146

[56] References Cited
UNITED STATES PATENTS

| | | | |
|---|---|---|---|
| 1,286,631 | 12/1918 | Hillyard | 35/71 |
| 2,583,805 | 1/1952 | Astle | 35/72 UX |
| 3,670,427 | 6/1972 | Stolpen | 35/35 J |
| 1,224,742 | 5/1917 | Hillyer | 35/35 H X |
| 1,285,038 | 11/1918 | Chance | 35/35 H X |
| 3,200,517 | 8/1965 | D'Agostino | 35/35 H UX |

FOREIGN PATENTS OR APPLICATIONS

| | | | |
|---|---|---|---|
| 622,219 | 6/1961 | Canada | 35/71 |
| 1,017,766 | 10/1952 | France | 35/35 J |
| 11,484 | 1906 | Great Britain | 35/71 |

*Primary Examiner*—Wm. H. Grieb
*Attorney*—Harvey W. Mortimer, Michael J. Sweedler et al.

[57] ABSTRACT

An educational device comprises a polyhedron with each surface of the polyhedron containing printed family sounds extending transversely from the edges of the surface. A wheel, which may be mounted for rotation with respect to any of the surfaces, includes a rim bearing letters which cooperate sequentially with the family sounds extending from the edges of adjacent surfaces when the wheel is turned.

3 Claims, 5 Drawing Figures

EDUCATIONAL DEVICE

The present invention pertains to educational devices. More specifically, this invention relates to a device which is useful as an educational aid in teaching children how to read.

The object of this invention is to provide an educational, toy-like device which is attractive to children and will held to familiarize them with a large number of family sounds and the different words which can be formed from each family sound.

Briefly, in accordance with the invention, a polyhedron has a plurality of printed family sounds on each of its surfaces. A wheel may be mounted for rotation in each of the polyhedron surfaces. The wheel includes a rim which bears letters adapted to cooperate with the family sounds extending from the edges of adjacent surfaces. By turning the wheel, a child can align the individual letters with a selected family sound and thereby learn to recognize the various family sounds and the different words which can be formed from them. By moving the wheel and/or turning the polyhedron, the child can align the wheel with any of the family sounds on the polyhedron.

The invention is described in detail below the reference to the attached drawings wherein.

Figure 1:
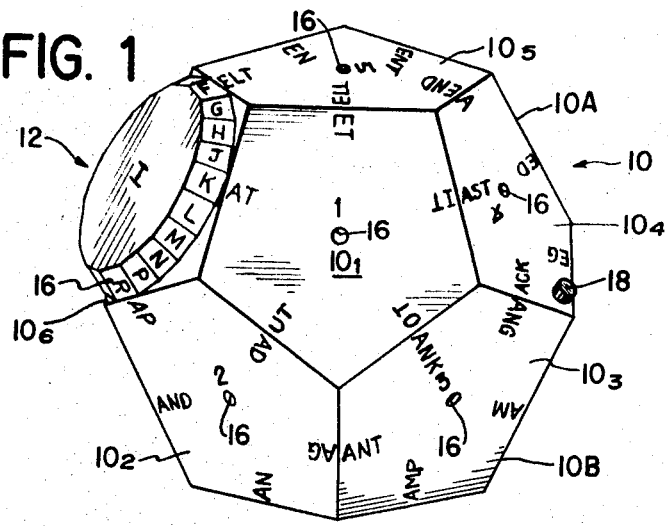
FIG. 1 is a perspective view of a preferred embodiment of the invention.
Figure 2:
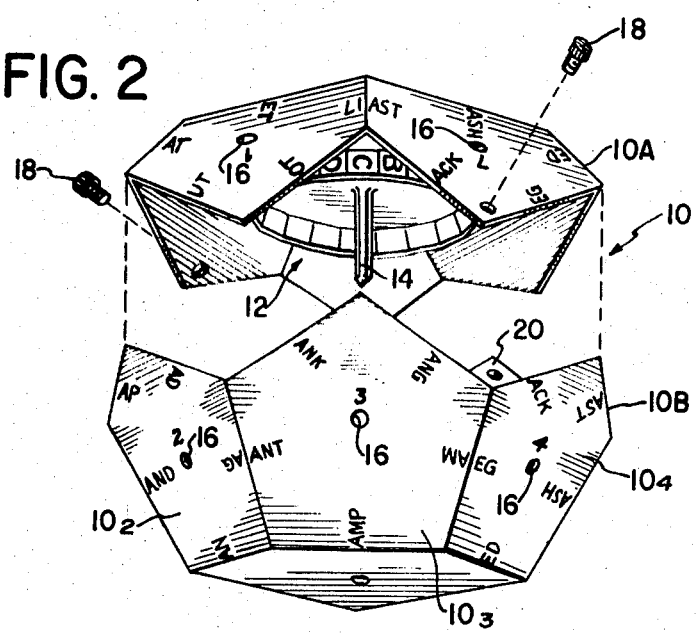
FIG. 2 is a perspective view of the polyhedron of FIG. 1 opened for the purposes of storing the wheel.

In the preferred embodiment illustrated in FIGS. 1 and 2, a twelve-sided polyhedron or dodecahedron 10 is used. Only six surfaces of dodecahedron 10 are visible in FIG. 1 and these surfaces are identified as surfaces $10_1$–$10_6$. A wheel 12 is rotatably mounted within surface $10_6$. As shown in FIG. 2, wheel 12 includes an integral spindle 14 which may be received in any one of the central apertures 16 located in the surfaces of dodecahedron 10.

Each of the surfaces of dodecahedron 10 includes five printed family sounds which extend transversely from the edges of the surface toward its center. For example, surface $10_1$ includes the five family sounds AT, ET, IT, OT, and UT. The wheel 12 includes a rim 16 which includes a multiplicity of separate facets (not numbered). A separate letter is printed on each of the facets of rim 16 in such a way that the letter can be aligned visually with a family sound on an adjacent surface to form a word. For example, in FIG. 1, the wheel 12 rotates within the surface $10_6$. Of the surfaces shown in FIG. 1, the letters on the rim 16 of wheel 12 can be aligned with the family sound ELT on surface $10_5$, the family sound AT on the surface $10_1$, and the family sound AP on the surface $10_2$.

Although, generally, the actual construction of the polyhedron 10 is not a feature of the invention, in the preferred embodiment, the polyhedron consists of two sections 10A and 10B (see FIG. 2) which are separable so that the polyhedron may be opened and used as a container for storing the wheel 12 when the device is not being used. The two sections 10A and 10B may be secured together in any desired way such as, for example, by the use of screws 18 cooperating with threaded holes within interior tabs 20. It is also contemplated that the sections 10A and 10B may be molded from plastic including interlocking male and female parts so that the two sections can be readily snapped together without the use of separate fastening means.

In practice, the user may be equipped with three separate dodecahedrons 10 each of a different color and coded according to degree of difficulty. Similarly, a number of wheels 12 will accompany the blocks 10. Each of the surfaces of each dodecahedron 10 will be numbered according to degree of difficulty so that a child may start by inserting the simplest wheel 12 into the lowest-numbered surface of the easiest block 10. He would turn the wheel 12 so that the letters on successive facets of rim 16 are aligned with a selected family sound (e.g. family sound AT on surface $10_1$). As the wheel is turned, the reader pronounces aloud each new word or sound (even a nonsense sound) that is formed. The child would progress through each of the surfaces of the first block with each available wheel, proceeding to the simplest surface on the next most difficult block and continuing until he had used all of the wheels with all surfaces of the three blocks.

Figure 3:
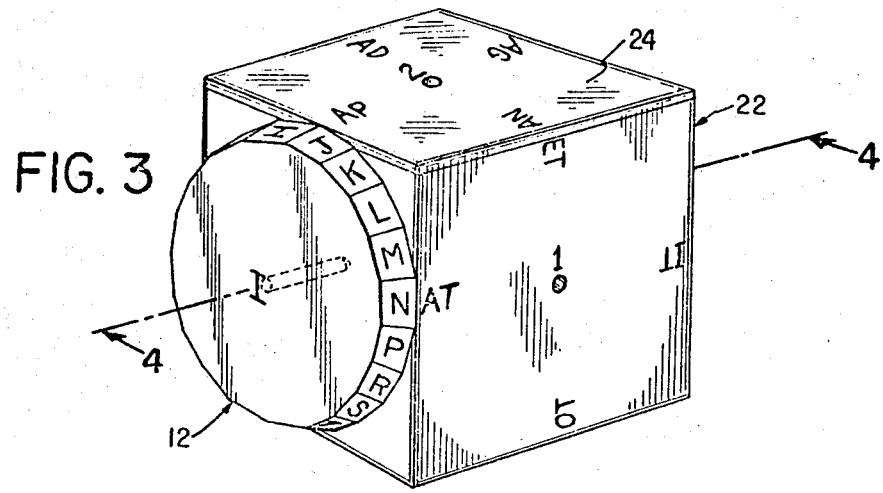
FIG. 3 is a perspective view of the second embodiment of the invention.
Figure 4:
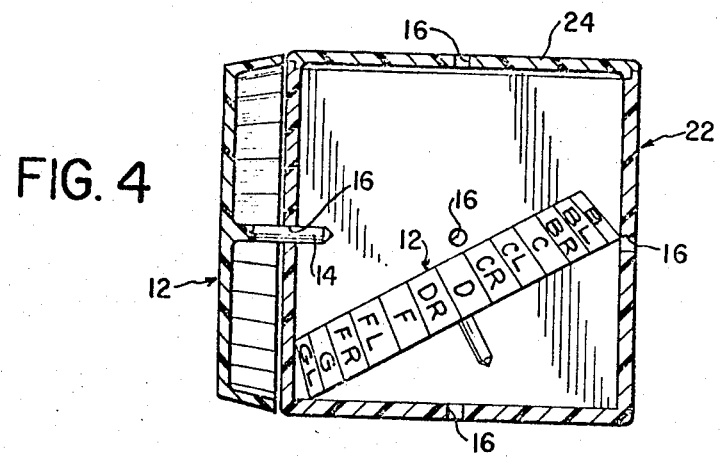
FIG. 4 is a sectional view along the line 4—4 of FIG. 3.

FIG. 3 shows a slightly different embodiment of the invention in which the polyhedron comprises a cube, five surfaces of which comprise a box 22 covered by a snap-on closure 24. As shown in FIG. 4, cover 24 can be opened so that wheel 12 may be inserted into the box for storage purposes. The cube, of course, is less complex than the dodecahydron of FIG. 1 and provides fewer family sounds.

Figure 5:
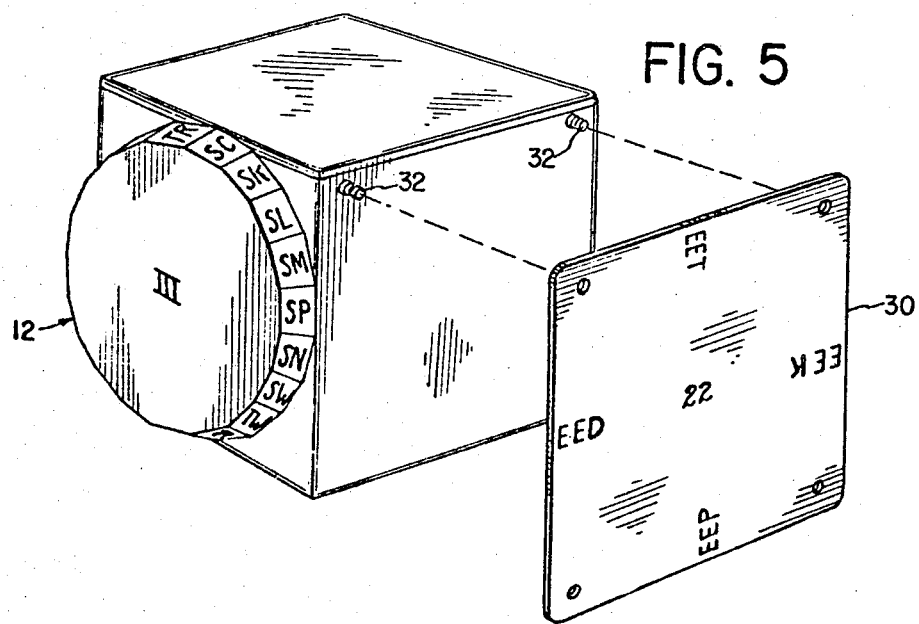
FIG. 5 is a perspective view of the embodiment of FIGS. 3 and 4 modified for the purpose of receiving individual cards to increase the capacity of the device.

In the embodiment of FIG. 5, separate cards 30 may be inserted onto pins 32 (or other protrusions) extending from a surface of the polyhedron. In this way, the capacity of the device may be increased without requiring the use of separate blocks. Cards 30 may be stored with the wheel 12 inside the box as shown in FIG. 4. The cards added may make up one- or multisyllable words or sounds, as word parts, affixes, prefixes, suffixes or other factors of the structural analysis of words.

As used in the specification and annexed claims, the term "family sound" is not limited to combinations of letters but is also intended to include numerals or other symbols which might be conveniently combined for educational purposes. Reference to "words" includes nonsense words (or phonemes) as well as real words and other combinations which may be formed as the indicia on a wheel and aligned with a selected family sound. It is also contemplated that two wheels may be used simultaneously to form, for example, prefixes and suffixes with a selected family sound.

What is claimed is:

1. An educational device comprising a polyhedron, each surface of the polyhedron containing printed family sounds extending transversely from respective edges of the surface toward its center, a wheel, and means for mounting said wheel for rotation about an axis through the center of a selected one of said surfaces, said wheel including a circumferential rim bearing letters each of which can be aligned with the family sounds extending on adjacent surfaces from the common edges defining said selected surface.

2. An educational device according to claim 1, wherein said wheel includes a plurality of facets with said facets bearing at least one letter, the facets lying approximately parallel to the adjacent surfaces when aligned with a family sound.

3. An educational device according to claim 1, wherein said polyhedron comprises at least two sections which may be separated to receive the wheel for storage purposes.

* * * * *